United States Patent Office 3,726,636
Patented Apr. 10, 1973

3,726,636
ALBUMINOUS-AMINOPLAST PRECURSOR-UREA DYE COMPOSITION FOR POLYAMIDE
Walter Baderscher, Biel, Basel-Land, Switzerland, and Thierry Stas de Richelle, Saint-Pierre-de-Chandieu, France, assignors to Ciba-Geigy AG, Basel, Switzerland
No Drawing. Original application Sept. 9, 1969, Ser. No. 856,495. Divided and this application Aug. 19, 1971, Ser. No. 173,266
Claims priority, application Switzerland, Sept. 24, 1968, 14,260/68
Int. Cl. D06p 1/68
U.S. Cl. 8—83                 7 Claims

ABSTRACT OF THE DISCLOSURE

Textile materials on the base of synthetic or natural polyamide fibres are dyed or printed with water-soluble wool-dyestuffs in the presence of (a) an aminoplast precondensate and an acid curing catalyst, (b) urea, thiourea or guanidine, (c) a hydroxyalkylcellulose and (d) an albuminous substance. After dyeing or printing the materials are steamed without intermediate drying. This process proves particularly advantageous in printing or padding thick or stiff materials such as fleeces, felts or carpet webs.

---

This is a division of application Ser. No. 856,495, filed Sept. 9, 1969, now abandoned.

It has been found that textile fibre materials containing polyamide can be dyed or printed in a valuable manner if an aqueous preparation is applied to the fibre materials which contains (a) a water-soluble dyestuff suitable for dyeing wool, (b) an aminoplastic precondensate as well as, optionally, an acid or potentially acid curing catalyst, (c) a compound of formula

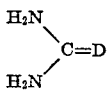

wherein D represents O, S or NH, (d) a hydroxyalkylcellulose as a thickener and (e) an albuminous substance, and the fibre materials are steamed without intermediate drying.

Suitable fibre materials containing polyamide can be of synthetic or natural origin. Thus for example both fibres from ε-caprolactam, hexamethylene diadipate or ω-aminoundecane-acid and wool or silk can be used. Mixed fabrics of wool and/or synthetic polyamide fibres with cellulosic fibres are also suitable.

Possible dyestuffs are water-soluble dyestuffs which are suitable for dyeing wool. This concept is to be understood to include those dyestuffs with which wool can be dyed according to the usual exhaustion processes. These dye-stuffs owe their water-solubility preferably to the presence of acid groups such as carboxylic acid groups or especially sulphonic acid groups or their amides as well as to the presence of acid sulphuric acid ester groups or alkylsulphone groups. They can be reactive or non-reactive towards the fibre material to be dyed and can in other respects belong to the most diverse classes such as for example those of the oxazine, triphenylmethane, xanthene, nitro, acridone or phthalocyanine dyestuffs, but especially to those of the metallised or metal-free monoazo or polyazo dyestuffs and of the anthraquinone dyestuffs. By reactive dyestuffs there are to be understood those dyestuffs which can form a chemical, that is to say covalent, bond with the material to be dyed.

The preparations to be employed in the present process furthermore contain an aminoplast pre-condensate. Possible products of this kind are especially etherified urea-formaldehyde or melamine-formaldehyde condensation products. They can be water-soluble, of limited water-solubility or only dispersible in water. Amongst the latter precondensates, which are insoluble in water, it is especially the methylolureas and methylolmelamines which are exclusively etherified with monoalcohols containing 4 to 6 carbon atoms, especially with butanol, which are suitable for the present process. A dispersing agent is as a rule necessary for water-insoluble aminoplast precondensates. As examples of suitable dispersing agents, especially for the butyl ethers just mentioned, Turkey red oil and/or casein may be mentioned.

It is however also possible to use water-soluble aminoplast precondensates, for example water-soluble ethers of methylolureas or methylolmelamines, of which the methylol groups are exclusively etherified with aliphatic monoalcohols containing 4 to 6 carbon atoms and with polyethylene glycols. Such aminoplast precondensates on steaming are converted into high molecular water-insoluble compounds so that a special dispersing agent which ultimately remains on the fibre material is not required.

According to the invention, the aqueous preparations must also contain compounds of formula

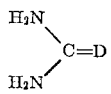

wherein D represents O, S or NH.

The compounds are thus urea, thiourea and guanidine, with urea and thiourea being preferred.

In order to fix the aminoplast precondensate onto the fibre material during steaming, it is generally advisable to use a curing catalyst for the aminoplast precondensate. Possible curing catalysts are the usual acids or potentially acid compounds such as ammonium chloride, ammonium sulphate, ammonium tartrate, zinc nitrate, zinc fluoborate, ammonium silicofluoride or tartaric acid.

In addition to the aminoplast precondensates which on drying and/or steaming undergo a curing process and effect a considerable improvement in the fastness properties of the dyed or printed material, it is necessary additionally to incorporate a hydroxyalkylcellulose as a binder and thickener into the dyeing preparation. Particularly when printing polyamide fibre materials it is advantageous to employ albuminous substances, such as for example casein, additionally to the cellulose derivatives such as for example hydroxyethylcellulose. On drying and steaming the hydroxyalkylcellulose coats the printed areas in a film-like manner and hence bonds the dyestuff to the fibre. The cellulose derivatives mentioned are water-soluble non-ionic cellulose ethers which are obtained by reaction of cellulose with lower alkylene oxides, preferably ethylene oxide. The average degrees of substitution for the hydroxyethylcellulose are appropriately between 1.8 and 2.5 hydroxyethyl groups per anhydroglucose unit of the cellulose, with the water-solubility of the cellulose derivatives increasing with increasing degree of substitution.

Yet further substances can be added to the aqueous preparations, such as anti-foaming agents, for example emulsified pine oil, or small amounts of levelling agents, if the combination of auxiliary agents is to show coagulation phenomena after addition of the dyestuff, or also solubilising agents such as for example cyclohexanol, butanol, benzyl alcohol, isophorone, or ethers of glycol and thiodiglycol. They can be employed individually or in combination.

The amounts of the preparations to be employed in accordance with the present process can vary within wide limits and should not exceed 30 g./kg. in roller printing and 20 g./kg. in film printing, relative to the printing paste. The amount of the aminoplast precondensate or polymerisation resin, calculated as anhydrous product and relative to the total preparation, is for example 0.1 to 5%, preferably 0.4 to 1.0%. The amount of curing catalyst should as usual be matched to the amount of aminoplast. The compound of formula

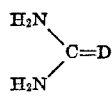

can be added in amounts of up to 10%, but preferably 2 to 5%. The amount of the thickener preparation consisting of the albuminous substance, the cellulose derivative, the aminoplast precondensate and the solubilising agent is preferably 3 to 10% relative to the dyeing preparation.

It is furthermore advantageous to manufacture aqueous preparations which in addition to the thickener preparation contain all the remaining components, from which preparations the dyeing preparations (printing pastes or dyeing liquors) are then prepared by adding the dyestuff and the curing catalyst, and diluting with water.

These preparations for example contain 20 to 30 parts of dyestuff, 150 to 200 (or 200 to 300) parts of the preparation for dyeing (or for printing) which has been mentioned, and 5 parts of a curing catalyst, with the difference from 1000 parts of preparation being made up with water.

The aqueous preparations which are used for the manufacture of the printing pastes and dyeing liquors, preferably contain (a) 20 to 50 parts of an aminoplast precondensate, for example etherified or non-etherified urea-formaldehyde or melamine-formaldehyde reaction products, (b) 50 to 150 parts of urea, thiourea or guanidine, (c) 20 to 50 parts of the hydroxyalkylcellulose, such as hydroxyethylcellulose, having an average degree of substitution of 2.5, and (d) 80 to 250 parts of an albuminous substance such as casein.

The difference from 1000 parts is made up with water and where appropriate with further additives such as solubilising agents, anti-foaming agents and the like.

The present process is suitable for dyeing nitrogen-containing fibre materials of all kinds, for example goods in hank or piece form, and for printing those fibre materials of which the form permits printing at all. The process proves particularly advantageous in printing thick, stiff or otherwise difficult to handle materials such as fleeces which can here for example be padded or treated by vigoureux printing, felts or carpet webs, for example so-called tufted carpets. After applying the preparation, the fibre material is steamed without intermediate drying for at least 5 minutes, preferably between 10 tnd 30 minutes, for example at temperatures between about 100 and 120° C. It can be appropriate to dry the material at temperatures of 100 to 150° C. after the steaming, whereby the last remnants of volatile constituents of the dyeing preparation can be removed and additionally the fixing of the dyestuffs can in some cases be improved further. The duration of drying is up to about 10 minutes at 100° C. and up to about 2 minutes at 150° C.

The present process is very valuable since on the one hand it permits continuous working whilst on the other hand it manages with a minimum of process stages, namely impregnating or printing, steaming and possibly post-drying. At the same time was dyestuffs are so well fixed that no subsequent washing-out is as a rule necessary. This above all proves advantageous in the case of the materials already mentioned, especially in the case of carpets. The resulting dyeings and prints are distinguished by good fastness to washing, rubbing and dry cleaning.

In the examples which follow the parts denote parts by weight and the percentages denote percentages by weight.

EXAMPLE 1

A printing paste of the following composition is prepared:
25 parts of the dyestuff of formula

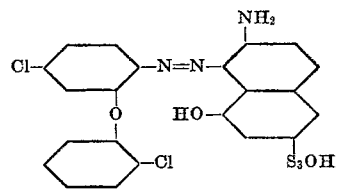

200 parts of preparation A
5 parts of ammonium chloride
770 parts of water
1000 parts (total)

A material of polyamide fibres (nylon 6 or 6,6) suitable for the manufacture of textile floor coverings is printed with this printing paste, steamed for 30 minutes at atmospheric pressure (atmospheres absolute) and subsequently dried hot. The carpet material thus obtained, which is printed red, has good fastness to rubbing as well as to solvents and foam cleaning.

Preparation A has the following composition:

100 parts of urea,
100 parts of thiodiglycol (50% strength aqueous solution),
10 parts of a dispersing agent consisting of a solution of
    60 parts of pine oil,
    30 parts of oleic acid,
    66 parts of 50% strength aqueous potassium hydroxide solution and
    34 parts of water,
325 parts of a thickener preparation consisting of 8% of hydroxyethylcellulose (powder, degree of substitution about 2.5)
    48.5% of casein 1:1,
    29% of cyclohexanol,
    14.5% of a condensation product of
        30 parts of urea,
        100 parts of 36% strength aqueous formaldehyde, and
        75 parts of butanol
465 parts of water
1000 parts (total)

EXAMPLE 2

A printing paste of the following composition is prepared:
25 parts of the 1:2 cobalt complex dyestuff from the dyestuff molecules

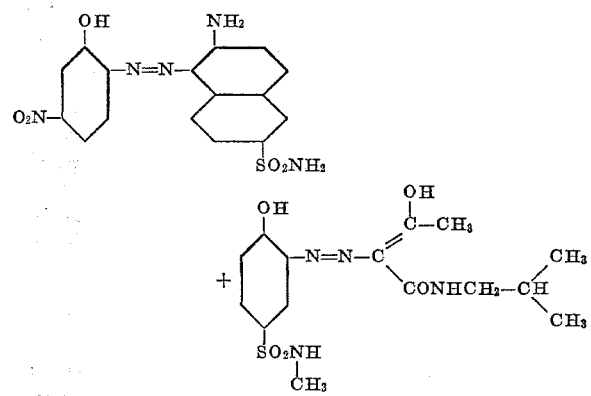

300 parts of preparation B
5 parts of ammonium chloride
670 parts of water
1000 parts (total)

A woven or knitted fabric of polyamide fibres is printed with this printing paste, steamed for 20 minutes under a pressure of 1 atmosphere excess and then post-dried hot. The material thus obtained, which is printed green, has good fastness properties.

Preparation B has the same composition as preparation A except that 100 parts of thiourea are employed instead of urea.

Instead of the dyestuff mentioned in this example, it is also possible to employ one of the following dyestuffs:

| No. | Formula | Shade |
|---|---|---|
| 1 | 1:2 chromium complex of the dyestuff | Red. |
| 2 | 1:2 chromium complex of the dyestuff | Grey. |
| 3 | 1:2 cobalt complex of the dyestuff | Bluish grey. |
| 4 | 1:2 cobalt complex of the dyestuff | Yellow. |
| 5 | | Red. |
| 6 | | Green. |
| 7 | | Blue. |

TABLE—Continued

| No. | Formula | Shade |
|---|---|---|
| 8 | 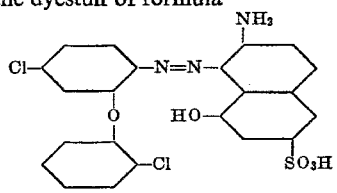 | Violet. |

EXAMPLE 3

A dyeing liquor of the following composition is prepared:

25 parts of the dyestuff of formula

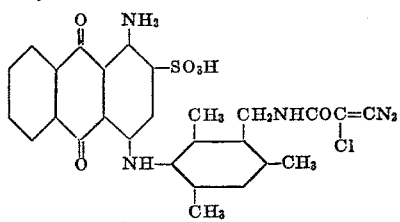

160 parts of preparation A
5 parts of ammonium chloride
810 parts of water
1000 parts (total)

A woven fabric or a material suitable for textile floor coverings (tufted or needle-punched material) made of polyamide is impregnated with this preparation on a padder and subsequently steamed for 20 minutes at atmospheric pressure. Dyeings with good fastness properties are obtained.

Instead of the abovementioned dyestuff, the dyestuffs mentioned in Example 2 can also be employed.

EXAMPLE 4

A printing paste of the following composition is prepared:

20 parts of dyestuff of formula

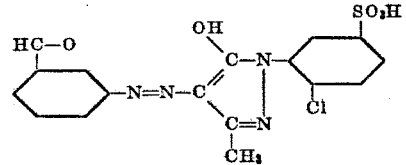

200 parts of preparation C,
5 parts of magnesium chloride,
775 parts of water
1000 parts (total)

Nylon 6,6 fibre material is printed with this printing paste, steamed for 30 minutes at atmospheric pressure (atmospheres absolute) and subsequently dried hot.

The material thus obtained, which is printed blue, has good fastness to rubbing as well as to solvents and foam cleaning.

Preparation C has the following composition:

100 parts of guanidine,
25 parts of hydroxyethylcellulose (powder, degree of substitution about 2.5),
500 parts of casein (aqueous solution, 1:1),
40 parts of a condensation product from a 2:1 to 1:2 mixture of melamine and ethyleneurea with formaldehyde, and subsequent etherification with methanol,
335 parts water
1000 parts (total)

Instead of the condensation product mentioned, it is also possible to use a mixture of a methylolmelamine etherified with methanol and an ethyleneurea-formaldehyde reaction product.

Equally good results are achieved if instead of the nylon 6,6 fibre material a nylon 6-cellulose (80:20) mixed woven fabric is printed with the printing paste described.

EXAMPLE 5

The following dyeing liquor is prepared for dyeing a nylon-6 woven fabric:

25 parts of the 1:1 chromium complex of the dyestuff

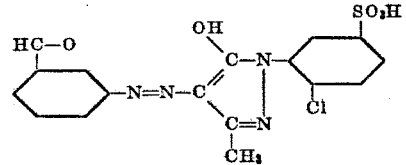

200 parts of preparation D,
5 parts of ammonium chloride,
770 parts of water
1000 parts (total)

The woven fabric is impregnated with this preparation on padder and subsequently steamed for 20 minutes at atmospheric pressure. A brownish yellow dyeing with good fastness properties is obtained.

Preparation D has the following composition:

100 parts of urea,
25 parts of hydroxyethylcellulose (powder, degree of substitution about 2.5),
250 parts of casein (aqueous solution, 1:1),
20 parts of a 75% strength aqueous solution of a methylol-melamine having an average of 5 methylol groups, of which an average of 2½ are etherified with methanol,
605 parts of water
1000 parts (total)

Instead of the above mentioned dyestuffs, the dyestuffs from Example 2, or the dyestuff of formula

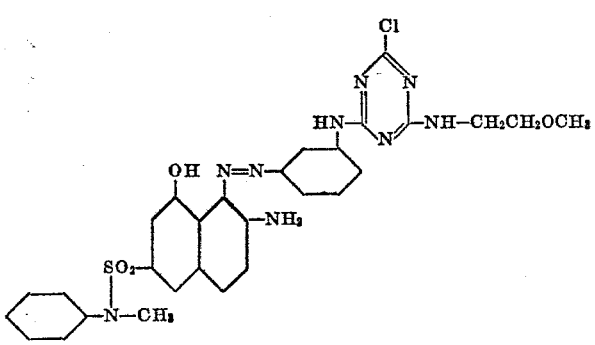

can also be employed.

What is claimed is:

1. Aqueous preparation suitable for admixture with water-soluble wool dyestuff for dyeing and printing polyamide-containing textiles which comprise (a) 20 to 50 parts of an aminoplast precondensate, (b) 50 to 150 parts of urea, thiourea or guanidine, (c) 20 to 50 parts of a hydroxyalkylcellulose and (d) 80 to 250 parts of an albuminous substance, with the difference from 1000 parts being made up with water.

2. Aqueous preparation according to claim 1 which comprises (a) 20 to 50 parts of an etherified or non-etherified urea-formaldehyde or melamine-formaldehyde precondensate, (b) 20 to 150 parts of urea, thiourea or guanidine, (c) 20 to 50 parts of hydroxyethylcellulose and (d) 80 to 250 parts of casein, with the difference from 1000 parts being made up with water.

3. A composition for dyeing or printing polyamide textiles which comprises:
  (a) 2 to 3% by weight of a water soluble acid dyestuff suitable for dyeing wool
  (b) 15 to 30% by weight of an aqueous preparation which comprises
    (i) 2 to 5% by weight of an urea formaldehyde or melamine formaldehyde reaction product
    (ii) 5 to 15% by weight of urea, thiourea or guanidine
    (iii) 2 to 5% by weight of water soluble hydroxyethyl cellulose and
    (iv) 8 to 25% by weight of casein and
    (v) water to make 100%
  (c) .1 to 5% by weight of an acid acting aminoplast curing catalyst
  (d) water to make 100% and thereafter steamint the textile without intermediate drying.

4. A composition according to claim 3, in which an etherified urea-formaldehyde reaction product is used in component (b).

5. A composition according to claim 3 in which the formaldehyde reaction product component (b) is water-insoluble.

6. A composition according to claim 3 in which component (b)(ii) is thiourea.

7. A composition according to claim 3 which additionally contains, as a solubilizing agent, cyclohexanol, butanol, benzyl alcohol, isophorone, glycol ether or thiodiglycol ether.

References Cited

UNITED STATES PATENTS

| | | | |
|---|---|---|---|
| 2,681,322 | 6/1954 | Auer | 260—6 |
| 2,628,151 | 2/1953 | Walmsley | 8—17 |
| 2,361,454 | 10/1944 | Cassel | 8—62 |
| 2,356,794 | 8/1944 | Ker | 8—18 UX |
| 3,240,553 | 3/1966 | Paul | 8—62 X |

FOREIGN PATENTS

| | | | |
|---|---|---|---|
| 503,518 | 6/1954 | Canada | 260—6 |

OTHER REFERENCES

Chemical Technology of Dyeing & Printing, Diserens, pp. 311–315, Pub. 1951, vol. 2, by Reinhold Pub. Co., New York, N.Y.

DONALD LEVY, Primary Examiner

U.S. Cl. X.R.

8--88, 74; 260—6